United States Patent
Vogt

(10) Patent No.: US 7,588,047 B2
(45) Date of Patent: Sep. 15, 2009

(54) COMPRESSOR BYPASS VALVE FOR USE IN MULTISTAGE SUPERCHARGING

(75) Inventor: Guenther Vogt, Holzkirchen (DE)

(73) Assignee: Robert Bosch, GmbH, Stuttgart (DE)

( * ) Notice: Subject to any disclaimer, the term of this patent is extended or adjusted under 35 U.S.C. 154(b) by 517 days.

(21) Appl. No.: 11/199,883

(22) Filed: Aug. 9, 2005

(65) Prior Publication Data

US 2006/0054848 A1   Mar. 16, 2006

(30) Foreign Application Priority Data

Sep. 16, 2004  (DE) .................. 10 2004 044 818

(51) Int. Cl.
*F16K 15/06* (2006.01)

(52) U.S. Cl. .............. 137/220; 137/514.5; 137/515.5; 137/536

(58) Field of Classification Search ............... 137/220, 137/514.5, 515, 515.5, 536, 542
See application file for complete search history.

(56) References Cited

U.S. PATENT DOCUMENTS

| | | | |
|---|---|---|---|
| 666,245 A | | 1/1901 | Gomaca |
| 1,111,319 A | * | 9/1914 | Paulsmeier ............... 137/514.5 |
| 1,802,720 A | * | 4/1931 | Junkers ...................... 137/220 |
| 2,602,631 A | * | 7/1952 | Eickmeye ................. 137/515.5 |
| 2,729,238 A | * | 1/1956 | Hite ........................... 137/542 |
| 2,809,660 A | * | 10/1957 | Becker ..................... 137/514.3 |
| 2,870,779 A | | 1/1959 | Thomiszer |
| 2,919,714 A | | 1/1960 | Mrazek |
| 3,194,255 A | | 7/1965 | Flaton et al. |
| 3,359,998 A | * | 12/1967 | Fike ........................... 137/220 |
| 3,552,426 A | * | 1/1971 | Hester et al. ........... 137/543.13 |
| 3,586,033 A | | 6/1971 | Hieber |
| 3,605,802 A | * | 9/1971 | Hertell ..................... 137/514.5 |
| 3,608,150 A | | 9/1971 | Laufer et al. |
| 3,993,093 A | * | 11/1976 | Mokveld ..................... 137/220 |
| 4,148,338 A | * | 4/1979 | Skoli ....................... 137/515.7 |
| 4,373,544 A | * | 2/1983 | Goodman et al. .......... 137/220 |
| 4,638,832 A | | 1/1987 | Mokveld |
| 4,709,552 A | | 12/1987 | Rutschmann et al. |
| 4,747,426 A | | 5/1988 | Weevers |
| 4,930,315 A | | 6/1990 | Kanesaka |
| 5,065,790 A | * | 11/1991 | Kornas .................... 137/514.5 |
| 5,199,261 A | | 4/1993 | Baker |

(Continued)

FOREIGN PATENT DOCUMENTS

DE    4434776 A1   4/1996

(Continued)

OTHER PUBLICATIONS

Office Action mailed Nov. 21, 2006 and Response filed May 21, 2007 in related U.S. Appl. No. 11/199,968.

(Continued)

*Primary Examiner*—John Rivell
(74) *Attorney, Agent, or Firm*—Baker & Daniels LLP

(57) ABSTRACT

A compressor bypass valve for multistage supercharging an internal combustion engine equipped with a supercharging system. The valve includes a displacement body accommodated in a valve housing. The displacement body is divided into a first displacement part and a second displacement part. The first displacement part, facing the upstream side, moves to close or open the bypass in response to a pressure differential.

18 Claims, 3 Drawing Sheets

U.S. PATENT DOCUMENTS

| | | |
|---|---|---|
| 5,408,979 A | 4/1995 | Backlund et al. |
| 5,704,391 A | 1/1998 | McGowan et al. |
| 5,782,259 A | 7/1998 | Ledbetter et al. |
| 5,921,276 A | 7/1999 | Lam et al. |
| 6,318,421 B1 | 11/2001 | LaGache |
| 6,427,711 B1 | 8/2002 | Kemp |
| 6,793,480 B2 | 9/2004 | Dominka |
| 2002/0005217 A1* | 1/2002 | Lyons ................... 137/220 |
| 2006/0054133 A1 | 3/2006 | Vogt |

FOREIGN PATENT DOCUMENTS

| | | |
|---|---|---|
| DE | 19514572 C2 | 10/1996 |
| EP | 1275832 A2 | 1/2003 |
| EP | 1387058 A2 | 2/2004 |
| EP | 1519017 A1 | 3/2005 |
| JP | 55-109728 A | 8/1980 |
| JP | 6-1200331 A | 9/1986 |
| JP | 8-28287 A | 1/1996 |
| WO | WO2004/046519 A1 | 6/2004 |
| WO | WO2005/083244 A1 | 9/2005 |
| WO | WO2006/050746 A1 | 5/2006 |

OTHER PUBLICATIONS

Final Office Action mailed Jul. 10, 2007 and Response and RCE filed Jan. 8, 2008 in related U.S. Appl. No. 11/199,968.

Office Action mailed Feb. 14, 2008 and Response filed Aug. 14, 2008 in related U.S. Appl. No. 11/199,968.

Office Action mailed Nov. 12, 2008 in related U.S. Appl. No. 11/199,968.

* cited by examiner

COMPRESSOR BYPASS VALVE FOR USE IN MULTISTAGE SUPERCHARGING

BACKGROUND OF THE INVENTION

To increase the power of internal combustion engines, exhaust gas turbochargers are used. Due to the large operating range of internal combustion engines in passenger vehicles, the exhaust gas turbocharger must be regulated in order to achieve a set boost pressure. To this end, in multistage supercharging the fresh air is compressed first in a low-pressure compressor and then in a high-pressure compressor. When large volumes of fresh air are present, the choke limit of the high-pressure compressor is exceeded. To keep the high-pressure compressor from functioning as a choke in this case, some of the fresh air can be diverted around the high-pressure compressor through a compressor bypass. When the volume of fresh air is below the choke limit of the high-pressure compressor, the compressor bypass is closed.

To keep the pressure build-up in the exhaust gas turbocharger from not [sic] lagging when the temperature of the exhaust gas is low and the volume of exhaust gas is very small, as is the case at low rpm, exhaust gas turbochargers of the kind currently used in internal combustion engines have a very low intrinsic mass and therefore respond even at low exhaust flow rates. The power limits of the exhaust gas turbocharger can be broadened for example by regulated two-stage supercharging, as known from Bosch, *Kraftfahrttechnisches Taschenbuch [Automotive Handbook]*, $23^{rd}$ Edition, Vieweg, 1999, pages 445-446. In regulated two-stage supercharging, two exhaust gas turbochargers of different sizes are connected in series. The stream of exhaust gas first flows into an exhaust manifold. From there, the exhaust gas stream is expanded via a high-pressure turbine. When large volumes of exhaust are present, as at high rpm, a portion of the mass flow of the exhaust gas can be diverted around the high-pressure turbine through a bypass. The entire exhaust gas mass flow is then utilized by a low-pressure turbine downstream of the high-pressure turbine. The mass flow of aspirated fresh air is first precompressed by a low-pressure stage and then compressed further in the high-pressure stage. Ideally, the fresh air mass flow is intercooled between the low-pressure stage and the high-pressure stage.

At low engine rpm, i.e., low exhaust gas mass flow rates, the bypass circumventing the high-pressure turbine remains completely closed and the entire exhaust gas mass flow is expanded via the high-pressure turbine. This produces a very rapid and high build-up of boost pressure. As the rpm increases, the expansion work is continuously shifted to the low-pressure turbine by virtue of a corresponding increase in the cross section of the bypass. Thus, regulated two-stage supercharging permits infinitely variable adjustment to engine demands on the turbine and compressor side. Due to the decreasing flow of exhaust gas through the high-pressure turbine, the compressor power of the high-pressure compressor also decreases. When fresh air mass flow rates are high, the compression is done by the low-pressure compressor alone. Fresh air does flow through the high-pressure compressor, but the pressure before and after the high-pressure compressor is the same. As soon as the choke limit of the high-pressure compressor is exceeded, that is, once the stream of fresh air flowing through the high-pressure compressor exceeds the volume flow that the high-pressure compressor can handle without pressure loss, the high-pressure compressor acts as a choke and the pressure of the fresh air decreases as it flows through the high-pressure compressor. To keep the choke limit from being exceeded, when fresh air mass flow rates are high, a portion of the fresh air is diverted around the high-pressure compressor through a compressor bypass. The compressor bypass contains a valve that closes or opens the bypass. This valve is currently controlled by means of an external control unit.

A sequence valve for sequential supercharging using two exhaust gas turbochargers is known from *ATZ Automobiltechnische Zeitschrift* 88 (1986), page 268. At low rpm, the sequence valve initially causes the fresh air to bypass one of the two compressors. The second compressor is not tied in until higher rotational speeds are reached. For this purpose, the bypass is made to accommodate a displacement body, the upstream and downstream sides of which are both subjected to a pressure force in the closed state. As long as the pressure force on the downstream side is greater than that on the upstream side, the valve is closed. As soon as the pressure on the upstream and downstream sides is equal, the valve opens. Since the entire displacement body is moved each time, a relatively large mass must be moved in order to open and close the bypass. This makes for relatively slow opening of the valve.

SUMMARY OF THE INVENTION

The inventive compressor bypass for multistage supercharging in internal combustion engines equipped with a supercharging system, e.g. an exhaust gas turbocharger, comprises a displacement body accommodated in a valve housing. The displacement body is divided into at least two displacement parts, of which a first displacement part, facing the upstream side, closes or opens the compressor bypass. The advantage of the inventive compressor bypass comprising a displacement body accommodated in a valve housing over the compressor sequencing valve comprising a displacement body known from the prior art, as used in sequential supercharging, is that owing to the two-part displacement body, only a very small mass must be moved in order to close or open the bypass. Rapid opening and closing can be ensured in this manner. Due to this rapid opening, when the choke limit is reached, a portion of the fresh air is immediately routed through the compressor bypass and the flow of fresh air through the high-pressure compressor is thereby reduced. This prevents the high-pressure compressor from acting as a throttle and the pressure from dropping as the flow passes through the high-pressure compressor.

A further reduction of the mass of the displacement body is achieved by the fact that the displacement body as implemented as a hollow body.

Imparting a flow-promoting or streamlined shape to the displacement body reduces pressure losses as the flow passes around the displacement body. This prevents any pressure drop as the flow passes through the bypass.

In a preferred embodiment, the displacement body is made from a lightweight metal or a lightweight-metal alloy. A particularly preferred material for fabricating the displacement body is aluminum. Further suitable materials are, for example, titanium or magnesium/titanium alloys. If there is intercooling of the fresh air after it is compressed in the low-pressure compressor, the displacement body can also be made of synthetic materials. The synthetic materials selected should be ones that are stable at the temperatures that occur. A suitable synthetic material is, for example, polytetrafluoroethene (PTFE).

The first displacement part, by which the bypass is closed or opened, is preferably guided into the second displacement part by means of a guide pin. For this purpose, a bore that receives the guide pin is fashioned in the second displacement part. To keep the guide pin from tilting and to improve its sliding properties, a bushing made of a static-friction-reducing material, for example polytetrafluoroethene (PTFE), is accommodated in the bore and the guide pin is guided within it.

To tightly seal the throat, the first displacement part is preferably embraced by a sealing element that lies against the valve housing when the valve is closed. A suitable sealing element is, for example, an O-ring. The material of the sealing element is preferably selected so that it is resistant to the temperatures in the throat. A suitable material is, for example, fluorine elastomer of the kind available commercially under the name Viton.

To deposit the first displacement part in its closure seat, a resilient element is accommodated in the displacement body. In a preferred embodiment, the resilient element is implemented as a spiral spring and embraces the guide pin. The pressure at which the first displacement part opens the bypass is adjusted by means of the biasing force of the resilient element. The biasing force of the resilient element acts in the opposite direction to the pressure force exerted on the first displacement part by the fresh air flowing through the bypass. Thus, as the biasing force increases, so does the opening pressure necessary to open the bypass.

The second displacement part is preferably connected to the valve housing via bridges and is thereby held in place. The bridges are preferably fastened to a retaining ring that is received in a groove in the valve housing. The bridges can have, for example, a rectangular, circular or triangular cross section, or any other cross section known to those skilled in the art. In a preferred embodiment, the bridges are implemented with a teardrop-shaped cross section and are thus shaped in a particularly flow-promoting manner. The second displacement part is preferably held in place by two or more bridges, particularly preferably by three or more bridges.

To enable the displacement body to be installed in the compressor bypass, the housing is preferably of two-part construction. In a preferred embodiment, the two housing parts are connected to each other by two half-shell clamps.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
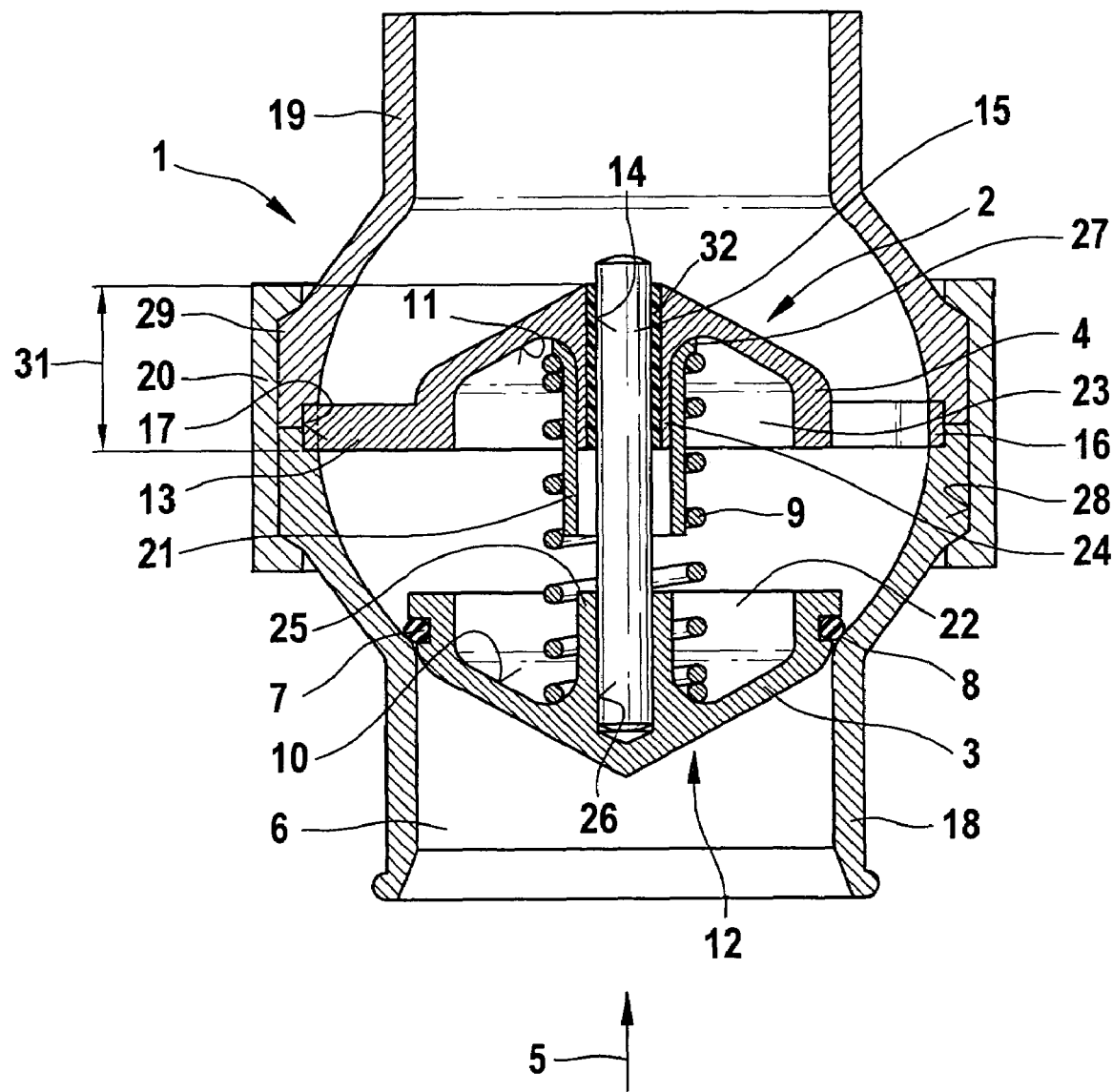
FIG. 1 depicts a compressor bypass valve with a displacement body accommodated therein and the throat closed.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PREFERRED EMBODIMENT

FIG. 1 shows a compressor bypass valve with a displacement body accommodated therein and the throat closed.

In a multistage, preferably two-stage, supercharging system comprising an exhaust gas turbocharger in an internal combustion engine, the fresh air is first compressed in a low-pressure compressor. The fresh air so compressed is preferably cooled in an intercooler before being delivered to a high-pressure compressor stage. When very small volumes of air are present, the fresh air is compressed in the high-pressure compressor stage. As the demand for fresh air increases, the choke limit of the high-pressure compressor is reached. To keep the high-pressure compressor from functioning as a choke, when the fresh air mass flow rate is above the choke limit of the high-pressure compressor, a portion of the fresh air is diverted around the high-pressure compressor through a compressor bypass 6.

Compressor bypass 6 comprises a valve housing 1 with a displacement body 2 accommodated therein. Displacement body 2 is divided into a first displacement part 3 and a second displacement part 4. First displacement part 3 faces the upstream side, i.e., the side of displacement body 2 first impinged on by the flow of fresh air. The inflow direction is indicated by the arrow marked with reference numeral 5.

As long as the pressure generated on the fresh-air side is below the required opening pressure of the compressor bypass 6 because the volume of fresh air is very low, compressor bypass 6 remains closed. For this purpose, first displacement part 3 rests, with a sealing element 7, in a closure seat 8 formed in valve housing 1. Sealing element 7 is preferably an O-ring, which is preferably made of an elastic material, such as, for example, fluorine elastomer or another temperature-stable elastic synthetic material known to those skilled in the art.

The force that causes first displacement part 3 to be placed in closure seat 8 is applied by a resilient element 9. Resilient element 9 is preferably a spiral spring implemented as a pressure spring.

Resilient element 9 bears with one end against an inner face 10 of first displacement part 3 and with the second end against a shoulder 27 of a bushing 21 that is connected to second displacement part 4. Said shoulder 27 is directed toward an inner face 11 of second displacement part 4. The force applied by resilient element 9 to the inner face 10 of first displacement part 3 places first displacement part 3 with sealing element 7 in its closure seat 8, thereby closing compressor bypass 6.

The flow is incident on first displacement part 3 on an upstream side 12 that is opposite inner face 10 of first displacement part 3. The air striking this upstream side 12 exerts a pressure force on first displacement part 3. As long as the pressure force on the upstream side 12 of first displacement part 3 is smaller than the biasing force of resilient element 9 exerted on the inner face 10 of first displacement part 3, first displacement part 3 rests with sealing element 7 in closure seat 8, thereby sealing compressor bypass 6. As the pressure of the air in compressor bypass 6 increases, so does the pressure force on the upstream side 12 of first displacement part 3. As soon as the pressure force on upstream side 12 is greater than the biasing force of resilient element 9, first displacement part 3 lifts out of closure seat 8, thereby opening compressor bypass 6. To prevent a sudden pressure drop from thereupon occurring at upstream side 12 and causing compressor bypass 6 to be sealed again, thus leading to undesirable pulsations, upstream side 12 is preferably configured in a flow-promoting manner. Configuring upstream side 12 in a flow-promoting or streamlined manner reduces pressure losses as the flow passes through compressor bypass 6.

As soon as the biasing force of resilient element 9 is greater than the pressure force acting on upstream side 12 of first displacement part 3, first displacement part 3 moves against inflow direction 5 and is thereby placed in closure seat 8 and seals off compressor bypass 6.

Second displacement part 4 is held in valve housing 1 by bridges 13. Said bridges 13 have, for example, a rectangular, triangular, circular or teardrop-shaped cross section, or any other cross section known to those skilled in the art. In a preferred embodiment, the cross section of the bridges 13 is configured as teardrop-shaped, the fresh air being incident on the semicircular end of the teardrop-shaped bridge 13. Bridge 13 is thereby configured in a particularly flow-promoting manner in the inflow direction.

Fashioned in second displacement part 4 is a bore 14 in which a guide pin 15 is movably received. First displacement part 3 is fixed to guide pin 15 at the end facing the upstream side. The connection between guide pin 15 and first displacement part 3 can be made in a force-locking or a form-locking manner. Thus, the connection can be effected, for example, by shrinking, as a press fit, as a screw connection, as a glued joint or as a welded joint. Guide pin 15 is preferably connected to first displacement part 3 by shrinking.

The length of guide pin 15 is so calculated that when compressor bypass 6 is closed, a large enough segment of guide pin 15 remains accommodated in bore 14 so that it cannot tilt or drop out of bore 14. In order for first displacement part 3 to be moved in inflow direction 5 or against inflow direction 5, bore 14 is preferably oriented parallel to inflow direction 5. A bushing 32 in which guide pin 15 is guided is preferably accommodated in bore 14. Bushing 32 is preferably made of a static-friction-reducing material, for example PTFE, to improve the sliding properties of guide pin 15.

To save weight, a cavity 22 is formed in first displacement part 3 and a cavity 23 in second displacement part 4.

In the embodiment shown here, a chuck 24 that projects into cavity 23 is formed on second displacement part 4. Said chuck 24 prolongs the bore 14 that receives guide pin 15. The prolonged bore 14 increases the guide length 31 of guide pin 15 in bore 14, thereby ensuring that guide pin 15 will not tilt in bore 14.

As on second displacement part 4, a chuck 25 that projects into cavity 22 of first displacement part 3 is also formed on first displacement part 3. Fashioned in chuck 25 is a bore 26 that receives guide pin 15. In bore 26, guide pin 15 is connected to first displacement part 3 in a force-locking or form-locking manner.

Chuck 24 on second displacement part 4 is embraced by a bushing 21. Bushing 21 is preferably fastened force-lockingly to chuck 24 of second displacement part 4, for example by means of a screw connection. Formed on bushing 21 at the inner face 11 of second displacement part 4 is a circumferential, step-shaped shoulder 27. One side of resilient element 9 bears against this shoulder 27. The biasing force of resilient element 9 can be adjusted by means of the position of shoulder 27, which, for example, can be moved toward or away from first displacement part 3 by a screwing movement imposed on screwed-on bushing 21. As the distance between shoulder 27 and the inner face 10 of first displacement part 3 decreases, the biasing force in resilient element 9 increases. As the biasing force of resilient element 9 increases, greater force and thus a higher pressure in compressor bypass 6 are needed to open compressor bypass 6.

For installation purposes, valve housing 1 is preferably divided into a first housing part 18 and a second housing part 19. Valve housing 1 is preferably divided at the position where retaining ring 16 is accommodated. For this purpose, one portion of groove 17 is formed in first housing part 18 and the other in second housing part 19. Fitting the housing parts 18, 19 together causes the cross section of groove 17 to assume the same shape as the cross section of retaining ring 16. After the assembly of housing parts 18, 19 and second displacement part 4 with retaining ring 16 mounted thereon via bridges 13, the valve housing 1 is embraced by a band clamp 20, for example a V-band clamp or any other band clamp known to those skilled in the art.

A groove 28 is formed in band clamp 20 and a collar 29 is formed on valve housing 1. The cross section of collar 29 and the cross section of groove 28 are the same. So that housing parts 18, 19 can be joined to each other by means of band clamp 20, the collar 29 is formed half in first housing part 18 and half in second housing part 19. Thus, fitting the housing parts 18, 19 together produces collar 29, whose cross section matches that of groove 28 in band clamp 20. A durable connection of first housing part 18 to second housing part 19 is achieved by force- or form-locking connection with band clamp 20.

Figure 2:
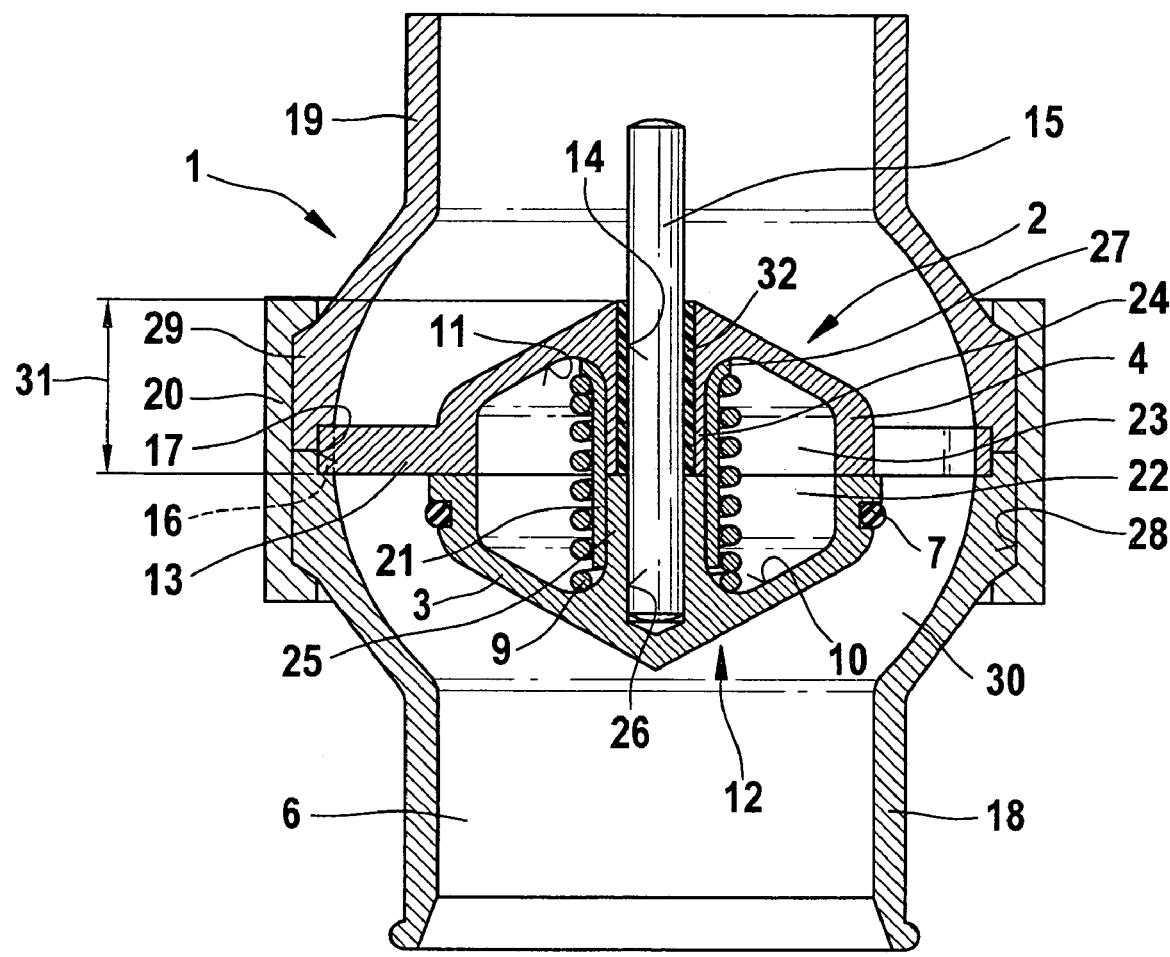
FIG. 2 depicts a compressor bypass valve with a displacement body accommodated therein and the throat open.
Figure 2:
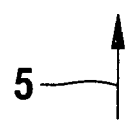

FIG. 2 shows an opened compressor bypass valve according to FIG. 1.

As soon as the pressure in compressor bypass 6 is so high that the pressure force acting on upstream side 12 is greater than the biasing force of resilient element 9, first displacement part 3 moves in inflow direction 5 to second displacement part 4. Sealing ring 7 is thereby lifted out of closure seat 8 and thus opens a throat 30 formed between valve housing 1 and displacement body 2. The direction of movement of first displacement part 3 is dictated by the guidance of guide pin 15 in bore 14.

To keep resilient element 9 from bending while being compressed during the movement of first displacement part 3 toward second displacement part 4, bushing 21 embraces resilient element 9. An enlarged bearing surface of resilient element 9 on bushing 21 is obtained by the fact that bushing 21 protrudes beyond chuck 24. The chuck 25 on first displacement part 3 is shaped so that it is received by bushing 21 and embraced by bushing 21 when compressor bypass 6 is open. When chuck 25 is inserted into bushing 21, a cushion of air that damps the movement of first displacement part 3 forms inside bushing 21 between chuck 24 on second displacement part 4 and chuck 25 on first displacement part 3. This prevents first displacement part 3 from striking sharply against second displacement part 4, and thus any potential rebounding.

When throat 30 is open, first displacement part 3 and second displacement part 4 are in contact and thus form a closed displacement body 2.

In the embodiment shown here, chucks 24, 25 are configured so that they, too, are in contact when throat 30 is open.

As soon as the pressure in compressor bypass 6 decreases and the pressure force acting on upstream side 12 is lower than the spring force exerted on first displacement part 3 by resilient element 9, first displacement part 3 moves away from second displacement part 4 until sealing element 7 is placed in closure seat 8 and thereby seals compressor bypass 6 again.

Figure 3:
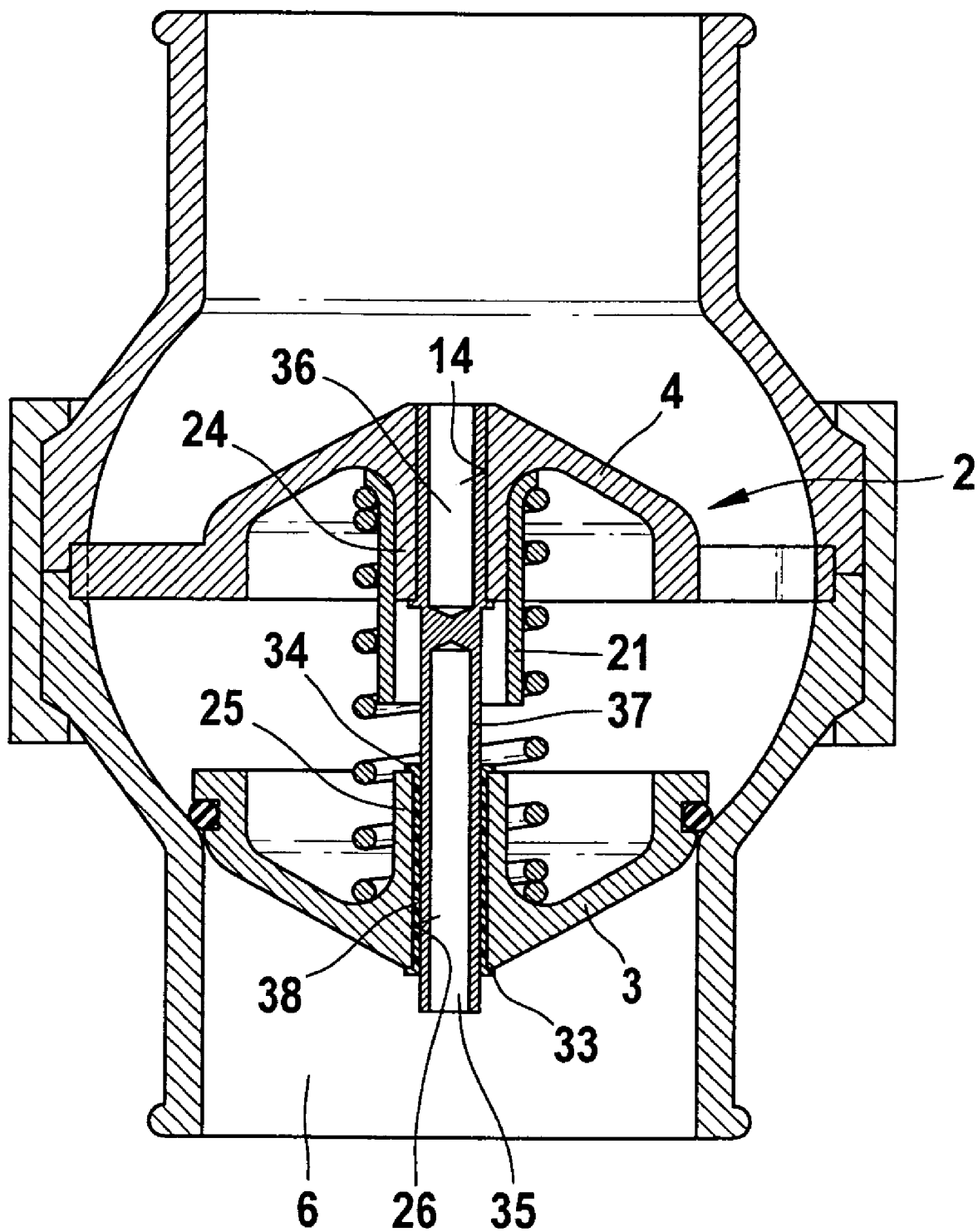
FIG. 3 depicts a further embodiment of a compressor bypass valve.

FIG. 3 shows a further embodiment of a compressor bypass valve according to the invention.

In the compressor bypass valve illustrated in FIG. 3, a guide pin 37 is connected force- or form-lockingly to the bore 14 in second displacement part 4. The connection can be made, for example, by shrinking, as a press fit, as a welded joint or as a screw connection.

First displacement part 3 is movably received on guide pin 37. To this end, bore 26 in first displacement part 3 embraces guide pin 37. To improve the sliding properties of first displacement part 3 on guide pin 37 and to prevent tilting, a bushing 38 is accommodated in bore 26. Said bushing 38 is preferably made of a material that reduces static friction. A suitable material is, for example, PTFE. However, it is also possible to use other materials, known to those skilled in the art, that have lower friction coefficients and are stable at the temperatures occurring in compressor bypass 6.

To keep bushing 38 from shifting in bore 26, a first collar 33 is formed at its one end and a second collar 34 at the other end. First collar 33 and second collar 34 each protrude beyond the diameter of bore 26. To enable bushing 32 to be installed, it is preferably split in the axial direction.

Since in the embodiment illustrated in FIG. 3 only the first displacement part 3 is moved, without guide pin 37, the moved mass is reduced further. This permits still more rapid opening of compressor bypass 6. As in the case of the embodiment shown in FIGS. 1 and 2, a chuck 25 is formed on first displacement part 3 and a chuck 24 on second displacement part 4. Chuck 24 is embraced by bushing 21. Bushing 21 protrudes past chuck 24. When compressor bypass 6 is opened, chuck 25 of first displacement part 3 moves into bushing 21 and is embraced thereby. A cushion of air that damps the movement of first displacement part 3 during opening is thereby formed between chuck 25 of first displacement part 3 and chuck 24 of second displacement part 4.

In the embodiment illustrated in FIG. 3, a first bore 35 and a second bore 36 are formed in guide pin 37. The forming of first bore 35 and second bore 36 increases the elasticity of guide pin 37. This makes it possible to compensate for differential thermal expansion when different materials have been selected for guide pin 37 and for first displacement part 3 and second displacement part 4, for example aluminum for first displacement part 3 and second displacement part 4 and steel for guide pin 37. The mass of displacement body 2 is also reduced further by first bore 35 and second bore 36.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A compressor bypass valve for use in multi-stage supercharging of an internal combustion engine, said valve comprising:
a valve housing, said valve housing including a compressor bypass passage; and
a displacement body disposed in said housing, said body including first and second displacement parts, said first displacement part facing an upstream side of said valve housing, said first displacement part movable relative to said valve housing and operative to open and close said bypass passage, wherein said second displacement part comprises a first chuck, a bushing surrounding said first chuck, said bushing including a portion which extends axially beyond said first chuck, said first displacement part including a second chuck, said second chuck slidably disposed in said bushing portion whereby, when said bypass passage is open a cushion of air forms between said first and second chucks to damp the movement of said first displacement part.

2. The valve of claim 1 wherein said first and second displacement parts respectively include first and second cavities whereby said body is hollow and lightweight.

3. The valve of claim 1 wherein said body is configured in a streamlined manner to reduce pressure losses in said valve.

4. The valve of claim 1 wherein said body is made of one of a lightweight metal and an alloy of a lightweight metal.

5. The valve of claim 4 wherein said lightweight metal is one of aluminum, titanium, and magnesium.

6. The valve of claim 1 further including a bore disposed in said second displacement part, a pin disposed in said bore for guiding said first displacement part as said first displacement part moves relative to said housing.

7. The valve of claim 6 further including a bushing disposed in said bore, said pin disposed in said bushing.

8. The valve of claim 7 wherein said bushing is made of a static-friction-reducing material.

9. The valve of claim 7 wherein said bushing is made of PTFE.

10. The valve of claim 1 including a guide pin secured to said second displacement part, and a bore in said first displacement part, said guide pin movably disposed in said bore.

11. The valve of claim 10 wherein a bushing is disposed in said bore, said bushing made of a static-friction-reducing material.

12. The valve of claim 11 wherein said bushing is made of PTFE.

13. The valve of claim 1 further including a seal, said seal disposed between said first displacement part and said valve housing when said bypass passage is closed.

14. The valve of claim 1 including a resilient means for biasing said first displacement part to close said bypass passage.

15. The valve of claim 14 wherein said resilient means is a spring.

16. The valve of claim 1 further comprising a plurality of bridges connecting said displacement body to said valve housing.

17. The valve of claim 1 wherein said valve housing comprises first and second housing parts.

18. The valve of claim 17 wherein said first and second housing parts are secured to one another by means of two half-shell clamps.

* * * * *